US012303906B2

(12) United States Patent
Ishikawa

(10) Patent No.: US 12,303,906 B2
(45) Date of Patent: May 20, 2025

(54) GRINDING APPARATUS

(71) Applicant: ASHIZAWA FINETECH LTD., Narashino (JP)

(72) Inventor: Tsuyoshi Ishikawa, Narashino (JP)

(73) Assignee: ASHIZAWA FINETECH LTD. (JP)

( * ) Notice: Subject to any disclaimer, the term of this patent is extended or adjusted under 35 U.S.C. 154(b) by 298 days.

(21) Appl. No.: 17/918,008

(22) PCT Filed: Mar. 23, 2021

(86) PCT No.: PCT/JP2021/012036
§ 371 (c)(1),
(2) Date: Oct. 10, 2022

(87) PCT Pub. No.: WO2021/215180
PCT Pub. Date: Oct. 28, 2021

(65) Prior Publication Data

US 2023/0141185 A1 May 11, 2023

(30) Foreign Application Priority Data

Apr. 20, 2020 (JP) ................................ 2020-074891

(51) Int. Cl.
*B02C 17/16* (2006.01)
*B02C 15/08* (2006.01)
*B02C 19/00* (2006.01)

(52) U.S. Cl.
CPC .......... *B02C 17/16* (2013.01); *B02C 19/0018* (2013.01)

(58) Field of Classification Search
CPC . B02C 17/16; B02C 19/0018; B02C 19/0025; B02C 15/08
See application file for complete search history.

(56) References Cited

U.S. PATENT DOCUMENTS 3,149,790 A 9/1964 Hoffstrom
3,869,090 A 3/1975 Roussel et al.
(Continued)

FOREIGN PATENT DOCUMENTS

CN 100358636 C 1/2008
CN 201728143 U 2/2011
(Continued)

OTHER PUBLICATIONS

Supplementary European Search Report for foreign counterpart EP application 21791744.2; mailed May 28, 2024 (4 pages).
(Continued)

*Primary Examiner* — Mohammed S. Alawadi
(74) *Attorney, Agent, or Firm* — Harness, Dickey & Pierce, P.L.C.

(57) ABSTRACT

A grinding apparatus includes: a rotating body configured to include therein a channel extending up to an opening formed in its own outer peripheral surface, the rotating body being configured to be capable of accommodating in the channel the substance to be ground and a grinding medium capable of grinding the substance to be ground; and a grinding container configured to include therein an accommodation space accommodating the rotating body and an opposed surface opposed to the opening of the rotating body, the opposed surface extending annually about the center axis of the rotating body. The grinding medium and the substance to be ground are capable of being moved from the channel to the accommodation space through the opening by rotating the rotating body. The grinding apparatus that can efficiently grind a substance to be ground can be realized.

17 Claims, 2 Drawing Sheets

(56) References Cited

U.S. PATENT DOCUMENTS

| | | | | |
|---|---|---|---|---|
| 4,641,787 | A | 2/1987 | Petersen et al. | |
| 5,326,038 | A * | 7/1994 | Nilsson | D21D 1/38 241/86.1 |
| 5,791,569 | A * | 8/1998 | Ishikawa | B02C 17/16 241/74 |
| 7,686,238 | B2 | 3/2010 | Makio et al. | |
| 7,905,434 | B2 | 3/2011 | Makio et al. | |
| 11,547,958 | B2 | 1/2023 | Onuki et al. | |
| 2007/0228201 | A1 | 10/2007 | Makio et al. | |
| 2010/0155516 | A1 | 6/2010 | Makio et al. | |
| 2011/0195312 | A1 | 8/2011 | Kume et al. | |
| 2017/0021359 | A1 | 1/2017 | Nakamura | |
| 2019/0366239 | A1 | 12/2019 | Onuki et al. | |

FOREIGN PATENT DOCUMENTS

| | | | |
|---|---|---|---|
| CN | 104759325 | A | 7/2015 |
| CN | 106362832 | A | 2/2017 |
| CN | 106861860 | A | 6/2017 |
| CN | 209188923 | U | 8/2019 |
| DE | 10338592 | A1 | 3/2005 |
| GB | 1491374 | A | 11/1977 |
| JP | H2-265660 | A | 10/1990 |
| JP | H03-065252 | A | 3/1991 |
| JP | 2001-190974 | A | 7/2001 |
| JP | 2002-143706 | A | 5/2002 |
| JP | 2005-125192 | A | 5/2005 |
| JP | 2018-038959 | A | 3/2018 |
| KR | 2019-0103240 | A | 9/2019 |
| RU | 2162014 | C1 | 1/2001 |
| TW | I428186 | B | 3/2014 |
| WO | 2004052567 | A2 | 6/2004 |
| WO | 2004-112964 | A1 | 12/2004 |

OTHER PUBLICATIONS

International Search Report (English and Japanese) and issued in PCT/JP2021/012036, mailed May 25, 2021; ISA/JP (5 pages).

* cited by examiner

GRINDING APPARATUS

CROSS REFERENCE TO RELATED APPLICATIONS

This application is a U.S. National Phase Application under 35 U.S.C. 371 of International Application No. PCT/JP2021/012036, filed on Mar. 23, 2021, which claims priority to Japanese Patent Application No. 2020-074891, filed on Apr. 20, 2020. The entire disclosures of the above applications are expressly incorporated by reference herein.

BACKGROUND

Technical Field

The present invention relates to a grinding apparatus that grinds a substance to be ground.

Background Art

As an apparatus configured to grind a substance to be ground, a powder processing apparatus including a deposition surface for the substance to be ground to deposit on, a processing surface opposed to the deposition surface and curved in a convex shape, and moving unit for relatively moving the deposition surface and the processing surface along the deposition surface has heretofore been proposed (for example, see WO 2004/112964). The deposition surface corresponds to an inner peripheral surface about an axis of a container member in which the substance to be ground is accommodated. In the abovementioned powder processing apparatus, when the deposition surface and the processing surface are relatively moved along the deposition surface, the substance to be ground is pressed toward, and rubbed against, the deposition surface by the processing surface. In other words, the substance to be ground undergoes a compression force and a shear force from the deposition surface and the processing surface. As a result, the substance to be ground is ground by the powder processing apparatus.

Aside from the foregoing, there has been a planetary ball mill as a powder processing apparatus using centrifugal force, where a plurality of mill pots arranged around a rotation shaft are rotated and revolved (for example, see Japanese Patent Application Laid-Open Publication No. 2002-143706).

According to WO 2004/112964, however, the substance to be ground is unable to be ground at all unless the substance to be ground deposits on the deposition surface. The substance to be ground is unable to be efficiently ground if the substance to be ground is collected to the inner bottom surface of the container member in the depth direction thereof by gravity. Japanese Patent Application Laid-Open Publication No. 2002-143706 discloses a batch type apparatus, which is difficult to be scaled up by upsizing.

In view of the foregoing circumstances, an object of the present invention is to provide a grinding apparatus that efficiently improves throughput.

SUMMARY

A grinding apparatus according to the present invention is a grinding apparatus configured to grind a substance to be ground, the grinding apparatus including: a rotating body configured to include therein a channel extending up to an opening formed in its own outer peripheral surface, the rotating body being configured to be capable of accommodating in the channel the substance to be ground and a grinding medium capable of grinding the substance to be ground; and a grinding container configured to include therein an accommodation space accommodating the rotating body and an opposed surface opposed to the opening of the rotating body, the opposed surface extending annular about a center axis of the rotating body. The grinding medium and the substance to be ground are capable of being moved from the channel to the accommodation space through the opening by rotating the rotating body.

In the grinding apparatus according to the present invention, the rotating body has an inlet opening capable of letting in the substance to be ground and the grinding medium, and the channel includes an interval where a channel width decreases outward in a radial direction of the rotating body.

The grinding apparatus according to the present invention also includes a moving mechanism configured to move the substance to be ground and the grinding medium separated from the rotating body into the channel of the rotating body again.

In the grinding apparatus according to the present invention, the grinding container has a reception opening capable of letting in the substance to be ground and the grinding medium, and a discharge opening capable of discharging the substance to be ground and the grinding medium to outside. The rotating body has an inlet opening that serves as an inlet for the substance to be ground and the grinding medium that have passed through the reception opening. The moving mechanism includes a circulation-path forming pipe that is connected to the grinding container through the discharge opening and the reception opening and forms a circulation path with the grinding container, and an airflow generation unit configured to generate an airflow from the discharge opening toward the reception opening in the circulation-path forming pipe. An opening of the circulation-path forming pipe on a side where the substance to be ground and the grinding medium are discharged is located inside the channel of the rotating body or in front of the inlet opening.

The grinding apparatus according to the present invention also includes a removal unit that is located between the opposed surface and the rotating body so as to be opposed to the opposed surface in a radial direction of the rotating body, and a moving unit configured to move the removal unit in a circumferential direction of the opposed surface. The removal unit is moved by the moving unit to come into contact with the substance to be ground deposited on the opposed surface and remove the substance to be ground deposited on the opposed surface.

In the grinding apparatus according to the present invention, the moving unit moves the removal unit so that the removal unit revolves about a rotation axis of the rotating body, and a revolving speed of the removal unit revolved by the moving unit is lower than a rotation speed of the rotating body.

The grinding apparatus according to the present invention also includes a guide blade that has a surface facing in a direction of rotation of the rotating body and extending in a radial direction of the rotating body and is disposed to be capable of revolving about a rotation axis of the rotating body. Revolution of the guide blade about the rotation axis generates an airflow in the accommodation space.

In the grinding apparatus according to the present invention, the opposed surface is formed of ceramics.

The grinding apparatus according to the present invention also includes a rotating-body rotating unit configured to rotate the rotating body about an axis parallel to an axis direction of the center axis of the rotating body.

In the grinding apparatus according to the present invention, when the rotating body is rotated by the rotating-body rotating unit, the substance to be ground in the channel is moved toward the opposed surface through the opening by a centrifugal force along with the grinding medium and collides with the opposed surface.

Advantageous Effects of Invention

The grinding apparatus according to the present invention can provide an excellent effect that the substance to be ground can be efficiently ground.

DESCRIPTION OF EMBODIMENTS

An embodiment of the present invention will be described below with reference to the accompanying drawings.

<Overall Configuration>

Figure 1:
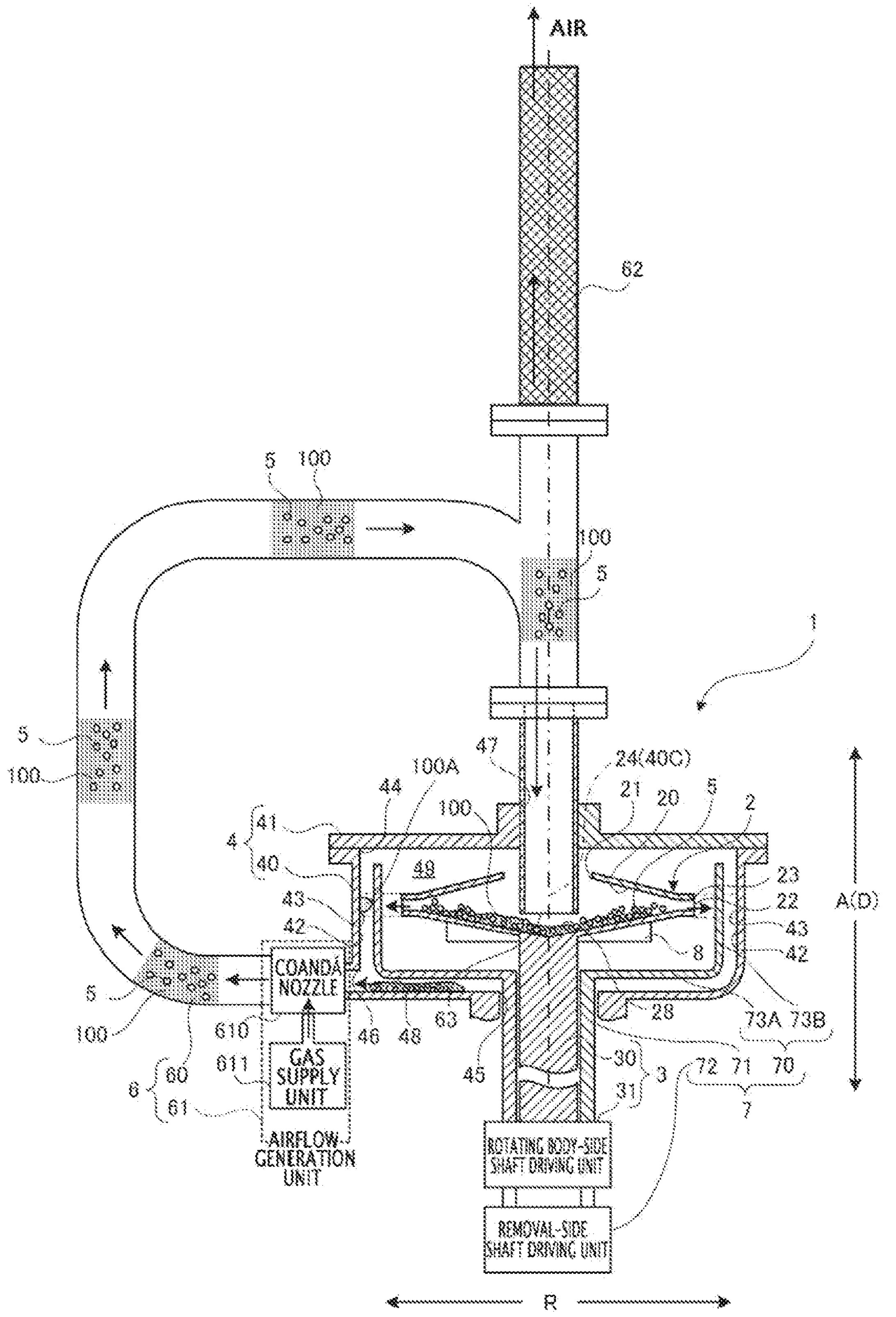
FIG. 1 is a schematic diagram of a grinding apparatus according to an embodiment of the present invention.

A grinding apparatus 1 according to the embodiment of the present invention will be described with reference to FIG. 1. The grinding apparatus 1 grinds a substance to be ground 100. As shown in FIG. 1, the grinding apparatus 1 includes a rotating body 2, a rotating-body rotating unit 3, a grinding container 4, a grinding medium 5, a circulation mechanism 6, a removal mechanism 7, and guide blades 8.

<Rotating Body>

As shown in a cross-sectional view of the rotating body 2 taken along an axial direction A of the rotating body 2 (hereinafter, referred to simply as an axial direction A) shown in FIG. 1, the rotating body 2 includes tapered channels 20 of frustum shape having an interval where the channel width decreases (tapers off) outward in a radial direction R of the rotating body 2 (hereinafter, referred to simply as a radial direction R) from the center of the rotating body 2. The tapered channels 20 may have a circular, polygonal, or other sectional shapes. The tapered channels 20 extend both to the right and left from the center along the radial direction R. An inlet opening 21 at which the tapered channels 20 open to outside and that is opposed to a reception opening 47 of the grinding container 4 in the axial direction A is formed in an upper end 20A of the rotating body 2 in the axial direction A (the end located near a lid unit 41 of the grinding container 4). Output openings 22 at which the tapered channels 20 open to outside and that are opposed to an inner wall surface 42 of the grinding container 4 in the radial direction R are formed in an outer peripheral surface 23 constituting outer edge portions (outer edge areas) of the rotating body 2 in the radial direction R. The tapered channels 20 described above accommodate the substance to be ground 100 to be ground by the grinding apparatus 1 and the grinding medium 5. The substance to be ground 100 and the grinding medium 5 accommodated in the tapered channels 20 enter through the inlet opening 21 and are discharged from the output openings 22. The rotating body 2 does not open at any location other than the inlet opening 21 or the outlet openings 22. As shown in FIG. 1, the rotating body 2 is attached to a rotating-body driving shaft 30 of the rotating-body rotating unit 3, and rotates with the rotation of the rotating-body driving shaft 30.

Figure 2A:
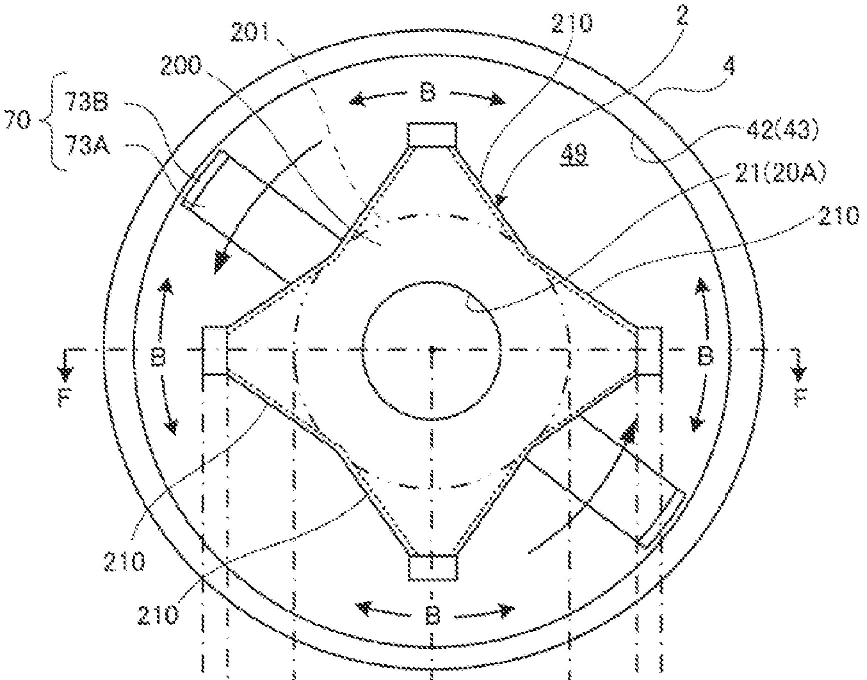
FIG. 2(A) is a plan view of a rotating body accommodated in a grinding container of the grinding apparatus according to the embodiment of the present invention.
Figure 2B:
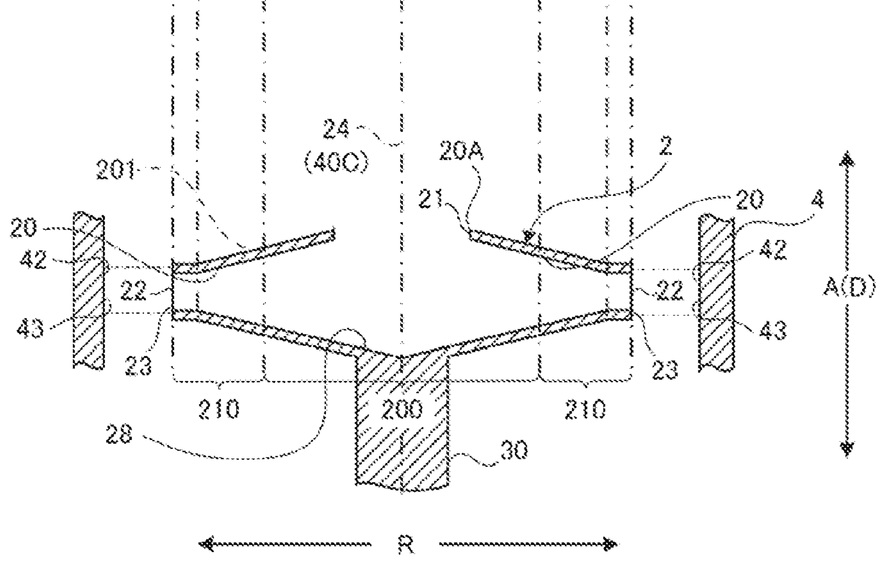
FIG. 2(B) is a cross-sectional view taken along line F-F of FIG. 2(A).

As shown in the plan view of FIG. 2(A), the rotating body 2 includes a disk portion 200 located at the center and four protrusions 210 protruding radially from an outer rim 201 of the disk portion 200 outward in radial directions R. The protrusions 210 are each formed in a frustum shape and arranged at regular intervals of approximately 90° in the circumferential direction of the disk portion 200. As shown in the cross-sectional view of FIG. 2(B), in terms of the relationship with the grinding container 4, the four protrusions 210 protrude toward the inner wall surface 42 of the grinding container 4, starting at the outer rim 201 of the disk portion 200. As shown in the plan view of FIG. 2(A), the entire rotating body 2 is thus formed in a substantially ninja-star shape (cross shape). The inlet opening 21 described above is formed in the center of the top side of the disk portion 200. The outlet openings 22 described above are formed in the ends of the protrusions 210. The tapered channels 20 are provided inside the disk portion 200 and the protrusions 210. The tapered channels 20 are therefore also arranged at regular intervals of approximately 90°.

Note that a plurality of protrusions 210 and a plurality of tapered channels 20 are located at regular intervals in the circumferential direction of the rotating body 2 or the disk portion 200. The protrusions 210 and the tapered channels 20 both only need to be at least two in number.

The entire rotating body 2 may be configured in a disk-like shape. Even in such a case, tapered channels 20, an inlet opening 21, and outlet openings 22 having similar structures to the foregoing are provided inside the rotating body 2.

<Rotating Unit>

As shown in FIG. 1, the rotating-body rotating unit 3 rotates the rotating body 2. As employed in the present invention, "rotation" may refer to being rotatable in forward and backward directions or being rotatable in either one of the forward and backward directions. The rotating-body rotating unit 3 includes the rotating-body driving shaft 30 and a rotating body-side shaft driving unit 31. In the present embodiment, the rotating-body driving shaft 30 is coaxial with a center axis 24 of the rotating body 2. The rotating-body driving shaft 30 is connected to the rotating body 2. The rotating body-side shaft driving unit 31 rotates the rotating-body driving shaft 30 about the center axis 24. When the rotating-body driving shaft 30 is rotated by the rotating body-side shaft driving unit 31, the rotating body 2 rotates with the center axis 24 as the axis of rotation. An example of the rotating body-side shaft driving unit 31 is a motor. However, this is not restrictive, and other members may be used. If the rotating-body driving shaft 30 is not coaxial with the center axis 24 of the rotating body 2, the axis of rotation of the rotating body 2 is an axis other than the center axis 24 and parallel to the center axis 24. Such a configuration is also covered by the present invention.

<Grinding Container>

The grinding container 4 accommodates the rotating body 2. As shown in FIG. 1, the grinding container 4 includes a container main body unit 40 and the lid unit 41. In the present embodiment, the container main body unit 40 has a closed-bottomed circular cylindrical shape. However, this is not restrictive, and the container main body unit 40 may have other closed-bottomed cylindrical shape.

As shown in FIG. 1, the container main body unit 40 has an accommodation space 49 having a size sufficient to accommodate the rotating body 2. The container main body unit 40 has an upper container opening 44 in the upper end in a depth direction D of the container main body unit 40, and a lower container opening 45 in the lower end in the depth direction D of the container main body unit 40. The accommodation space 49 is opened to outside through the upper container opening 44. The lower container opening 45 is intended for the rotating-body driving shaft 30 to be passed through. The rotating-body driving shaft 30 extends through the lower container opening 45 to near the center of the accommodation space 49 and is connected to the rotating body 2.

As shown in FIG. 2, the rotating body 2 is accommodated in the accommodation space 49 of the grinding container 4 so that its own center axis 24 and a center axis 40C of the container main body unit 40 along the depth direction D are coaxial with each other. Moreover, the outer periphery of the rotating body 2 is surrounded by the inner wall surface 42 of the container main body unit 40. The inner wall surface 42 has an opposed area opposed to the outlet openings 22 of the rotating body 2 in the radial directions R of the rotating body 2. The surface constituted by the opposed area will be referred to as an opposed surface 43. Since the outlet openings 22 rotate with the rotating body 2 about the center axis 24 of the rotating body 2, the opposed area is an annular area and the opposed surface 43 is an annular surface.

As will be described below, the substance to be ground 100 flying out of the outlet openings 22 collides with the opposed surface 43. The substance to be ground 100 is ground by the impact. In this sense, the opposed surface 43 functions as a collision surface to the substance to be ground 100 flying out of the outlet opening 22.

As shown in FIG. 1, the container main body unit 40 has a discharge opening 46, by which the accommodation space 49 is opened to outside, below the opposed surface 43 in the depth direction D of the container main body unit 40 (inner bottom surface 48 side). The discharge opening 46 is provided to discharge the substance to be ground 100 and the grinding medium 5 out of the grinding container 4.

As shown in FIG. 1, the lid unit 41 closes the upper container opening 44 of the container main body unit 40. In the present embodiment, the lid unit 41 has a disk-like shape. The reception opening 47 for making the accommodation space 49 communicate with outside is formed in the center of the lid unit 41.

All or a part of the grinding container 4 is desirably formed of ceramics, for example. If a part of the grinding container 4 is formed of ceramics, the portion constituting the opposed surface 43, in particular, of the grinding container 4 is desirably formed of the ceramics.

<Grinding Medium>

The grinding medium 5 is formed of a material capable of grinding the substance to be ground 100. For example, the grinding medium 5 can include at least one of the following types of beads: zirconia beads, carbide beads, and steel beads. However, this is not restrictive, and other types of beads may be included. The grinding medium 5 has a size that enables passage through a circulation path to be described below. The grinding medium 5 can thus circulate through the circulation path to be described below.

<Circulation Mechanism>

The circulation mechanism 6 repeatedly returns the substance to be ground 100 and the grinding medium 5 flying out of the rotating body 2 back into the rotating body 2. Note that a moving mechanism may be defined as a mechanism including not only the circulation mechanism 6 but also a return mechanism that returns the substance to be ground 100 and the grinding medium 5 flying out of the rotating body 2 back into the tapered channels 20 of the rotating body 2 not repeatedly but under an external operation. In such a case, the circulation mechanism 6 according to the present invention may be replaced with other moving mechanisms. The circulation mechanism 6 according to the present embodiment includes, for example, a circulation path-forming pipe 60 and an airflow generation unit 61.

As shown in FIG. 1, the circulation path-forming pipe 60 is connected to the grinding container 4 at the discharge opening 46 and the reception opening 47, and forms the circulation path with the tapered channels 20 of the rotating body 2 and the grinding container 4. For example, the circulation-path forming pipe 60 according to the present embodiment starts at the discharge opening 46, turns in 90° directions three times, passes through the reception opening 47 and the inlet opening 21, and extends up to in front of an inner bottom surface 28 of the rotating body 2. As a result, an end opening 63 of the circulation-path forming pipe 60 on one end side is located inside the tapered channels 20. Note that the circulation-path forming pipe 60 may extend up to in front of the inlet opening 21 (between the reception opening 47 and the inlet opening 21) instead of passing through the inlet opening 21.

The airflow generation unit 61 generates an airflow from the discharge opening 46 toward the reception opening 47 in the circulation-path forming pipe 60. For example, as shown in FIG. 1, the airflow generation unit 61 includes a nozzle (hereinafter, referred to as a Coanda nozzle) 610 that amplifies the amount of gas flow using the Coanda effect, and a gas supply unit 611 that supplies an amplifying gas to the Coanda nozzle 610.

For example, the gas supply unit 611 includes a compressor, and supplies compressed air to the Coanda nozzle 610. As the gas supply unit 611 supplies the compressed air to the Coanda nozzle 610, the Coanda nozzle 610 amplifies the flow rate of gas per unit time. For example, the Coanda nozzle 610 amplifies the flow rate of gas supplied from the gas supply unit 611 by approximately seven times. The gas amplified in the flow rate per unit time then flows through the circulation-path forming pipe 60 from the discharge opening 46 toward the reception opening 47. As a result, a clockwise airflow is generated in the circulation path. The substance to be ground 100 and the grinding medium 5 flying out of the rotating body 2 are thereby passed through the circulation-path forming pipe 60 and discharged from the end opening 63, and supplied into the tapered channels 20 of the rotating body 2 again.

To stabilize the function of the Coanda nozzle 610, an air filter 62 is provided to release the gas. If, for example, secondary air (amplified air) taken into the Coanda nozzle 610 is not released from the air filer 62, the internal pressure of the circulation path increases and the Coanda effect due to negative pressure suction is not successfully obtained.

The circulation mechanism 6 according to the present embodiment can repeatedly circulate the substance to be ground 100 along the circulation path. The substance to be ground 100 can thus be made to collide with the opposed surface 43 repeatedly.

<Removal Mechanism>

The removal mechanism 7 removes the substance to be ground 100 deposited on the opposed surface 43. As shown in FIG. 1, the removal mechanism 7 includes a removal unit 70, a removal-side driving shaft 71 coaxial with the rotating-body driving shaft 30, and a removal-side shaft driving unit 72.

The removal unit 70 is located between the opposed surface 43 and the rotating body 2 so as to be opposed to the opposed surface 43. For example, in the present embodiment, the removal unit 70 includes two L-shaped plate members as illustrated in FIG. 1. The L-shaped plate members are held by the removal-side driving shaft 71. Here, each L-shaped plate member is oriented so that a portion (radially extending portion 73A) corresponding to one of the sides of the L shape starts at the removal-side driving shaft 71 and extends in the radial direction R up to near the inner wall surface 42 of the grinding container 4, and a portion (depthwise extending portion 73B) corresponding to the other side of the L shape extends substantially in parallel with the depth direction D up to a height opposite to the opposed surface 43. As shown in FIG. 2(A), the portions (radially extending portions 73A) corresponding to the one sides of the L shapes of the two L-shaped plate members extend in opposite directions, starting at the removal-side driving shaft 71.

As shown in FIG. 2(A), the removal-side shaft driving unit 72 rotates the removal-side driving shaft 71, so that the two L-shaped plate members revolve in the circumferential direction of the opposed surface 43.

The rotation speed at which the removal-side shaft driving unit 72 rotates the removal-side driving shaft 71 is desirably such a speed as causes a difference in speed from that of the rotating-body driving shaft 30. In particular, the rotation speed is desirably lower than that of the rotating-body driving shaft 30. In other words, the revolving speed of the removal unit 70 is desirably lower than the rotation speed of the rotating body 2. This can prevent the two L-shaped plate members as much as possible from interfering with the collision of the substance to be ground 100 with the opposed surface 43.

Alternatively, the portions (depthwise extending portions 73B) corresponding to the other sides of the L shapes of the L-shaped plate members may be regarded as a removal unit 70. Furthermore, the portions (radially extending portion 73A) corresponding to one of the one of sides of the L shapes of the L-shaped plate members, the removal-side driving shaft 71, and the removal-side shaft driving unit 72 may be regarded as a moving unit configured to move the removal unit 70 (depthwise extending portions 73B) in the circumferential direction of the inner wall surface 42 of the grinding container 4.

<Guide Blades>

The guide blades 8 are disposed to be capable of revolving about the rotating-body driving shaft 30. For example, the guide blades 8 are made of plate members. As shown in FIG. 1, the guide blades 8 include flat portions facing in the direction of rotation of the rotating body 2 and extending outward in the radial directions R of the rotating body 2. The guide blades 8 are connected to the rotating-body driving shaft 30 or the rotating body 2.

As the guide blades 8 revolve about the rotating-body driving shaft 30, the flat portions agitate the air to generate an airflow in the accommodation space 49. As a result, the airflow moves the substance to be ground 100 in the accommodation space 49 and guides the substance to be ground 100 to the discharge opening 46.

<Operation of Grinding Apparatus>

An operation of the grinding apparatus 1 will be described with reference to FIG. 1. For example, the substance to be ground 100 and the grinding medium 5 are initially placed into the tapered channels 20 of the rotating body 2 through the reception opening 47 of the grinding container 4 or through the upper container opening 44 of the container main body unit 40 with the lid 41 removed. When the rotating body 2 is then rotated by the rotating-body rotating unit 3, the substance to be ground 100 and the grinding medium 5 are moved outward in the radial directions R of the rotating body 2 through the tapered channels 20 by centrifugal force, and fly outward out of the outlet openings 22. In the present embodiment, the tapered channels 20 taper off outward in the radial directions R of the rotating body 2. The rotating body 2, when rotated, can thus function like a centrifugal pump to move the substance to be ground 100 and the grinding medium 5 outward in the radial directions R along the tapered channels 20 at high speed.

In the process of the substance to be ground 100 moving through the tapered channels 20, the substance to be ground 100 undergoes a friction force and a shear force from the grinding medium 5 and the tapered channels 20, and is thereby ground. The substance to be ground 100 and the grinding medium 5 flying out of the outlet openings 22 then collide with the opposed surface 43. The substance to be ground 100 is further ground by the impact of the collision. In the present embodiment, the substance to be ground 100 is thus ground not only by the impact force from the collision with the opposed surface 43 but also by the friction force and shear force from the grinding medium 5 moving together. The grinding apparatus 1 according to the present embodiment can thus grind the substance to be ground 100 more efficiently in a shorter time than heretofore.

As shown in FIG. 1, the substance to be ground 100 adheres to and deposits on the opposed surface 43. The removal unit 70 (L-shaped plate members) revolving comes into contact with the deposit, i.e., deposited substance to be ground 100A and causes the deposited substance to be ground 100A to crumble and fall on the inner bottom surface 48 of the container main body unit 40.

Meanwhile, the airflow generation unit 61 generates the airflow to circulate through the circulation path. As shown in FIG. 1, the airflow moves the substance to be ground 100 and the grinding medium 5 fallen on the inner bottom surface 48 of the container main body unit 40 to the circulation-path forming pipe 60 through the discharge opening 46. The substance to be ground 100 and the grinding medium 5 then pass through the circulation-path forming pipe 60, the reception opening 47, and the inlet opening 21, and are discharged into the tapered channels 20 of the rotating body 2 again. The substance to be ground 100 discharged into the tapered channels 20 is moved outward in the radial directions R by a centrifugal force again along with the grinding medium 5, collides with the opposed surface 43, and undergoes the impact of the collision again and is further ground. The substance to be ground 100 is ground finer and finer by the repetition of such operations. Finally, a (not-shown) changeover valve is operated to switch the passage of the substance to be ground 100 to a (not-shown) collection pipe branching off from the circulation path (for example, circulation-path forming pipe 60). As a result, the finely ground substance to be ground 100 flows into the (not-shown) collection pipe and collected through a discharge opening of the (not-shown) collection pipe.

The grinding apparatus 1 according to the present invention can apply an impact force, a compression force, a shear force, and the like to the substance to be ground 100 by the foregoing operation. The use of the grinding apparatus 1 according to the present invention is thus useful in applying a treatment using a mechanochemical phenomenon to the substance to be ground 100. It will be understood that the grinding apparatus 1 according to the present invention is also useful for treatments other than that using a mechanochemical phenomenon.

The grinding apparatus 1 of the present invention is not limited to the above-described embodiments, and various modifications can be made without departing from the gist of the present invention.

The invention claimed is:

1. A grinding apparatus configured to grind a substance to be ground, the grinding apparatus comprising:

a rotating body configured to include therein a channel extending up to an opening formed in an outer peripheral surface of the rotating body, the rotating body being configured to be capable of accommodating in the channel the substance and a grinding medium capable of grinding the substance; and a grinding container configured to include therein:

an accommodation space accommodating the rotating body; and an opposed surface opposed to the opening of the rotating body, the opposed surface extending annular about a center axis of the rotating body, wherein the grinding medium and the substance are capable of being moved from the channel to the accommodation space through the opening by rotating the rotating body, the rotating body has an inlet opening capable of letting the substance and the grinding medium therein, and the channel includes an interval where a channel width decreases outward in a radial direction of the rotating body.

2. The grinding apparatus according to claim 1, further comprising:

a guide blade that has a surface facing in a direction of rotation of the rotating body and extending in the radial direction of the rotating body, the guide blade being disposed to be capable of revolving about a rotation axis of the rotating body, wherein revolution of the guide blade about the rotation axis generates an airflow in the accommodation space.

3. The grinding apparatus according to claim 1, wherein the opposed surface is formed of ceramics.

4. The grinding apparatus according to claim 1, further comprising a rotating-body rotating unit configured to rotate the rotating body about an axis parallel to the center axis of the rotating body.

5. The grinding apparatus according to claim 4, wherein, when the rotating body is rotated by the rotating-body rotating unit, the substance in the channel is moved toward the opposed surface through the opening by a centrifugal force along with the grinding medium and collides with the opposed surface.

6. A grinding apparatus configured to grind a substance to be ground, the grinding apparatus comprising:

a rotating body configured to include therein a channel extending up to an opening formed in an outer peripheral surface of the rotating body, the rotating body being configured to be capable of accommodating in the channel the substance and a grinding medium capable of grinding the substance;

a grinding container configured to include therein:

an accommodation space accommodating the rotating body; and an opposed surface opposed to the opening of the rotating body, the opposed surface extending annular about a center axis of the rotating body; and a moving mechanism configured to move the substance and the grinding medium that are separated from the rotating body into the channel of the rotating body again, wherein the grinding medium and the substance are capable of being moved from the channel to the accommodation space through the opening by rotating the rotating body.

7. The grinding apparatus according to claim 6, wherein:

the grinding container has a reception opening capable of letting the substance and the grinding medium therein, and a discharge opening capable of discharging the substance and the grinding medium to an outside;

the rotating body has an inlet opening that serves as an inlet for the substance and the grinding medium that have passed through the reception opening;

the moving mechanism includes a circulation-path forming pipe that is connected to the grinding container through the discharge opening and the reception opening and that forms a circulation path with the grinding container, and an airflow generation unit configured to generate an airflow from the discharge opening toward the reception opening in the circulation-path forming pipe; and a pipe opening of the circulation-path forming pipe on a side where the substance and the grinding medium are discharged is located inside the channel of the rotating body or in front of the inlet opening.

8. The grinding apparatus according to claim 6, further comprising:

a guide blade that has a surface facing in a direction of rotation of the rotating body and extending in a radial direction of the rotating body, the guide blade being disposed to be capable of revolving about a rotation axis of the rotating body, wherein revolution of the guide blade about the rotation axis generates an airflow in the accommodation space.

9. The grinding apparatus according to claim 6, wherein the opposed surface is formed of ceramics.

10. The grinding apparatus according to claim 6, further comprising a rotating-body rotating unit configured to rotate the rotating body about an axis parallel to the center axis of the rotating body.

11. The grinding apparatus according to claim 10, wherein, when the rotating body is rotated by the rotating-body rotating unit, the substance in the channel is moved toward the opposed surface through the opening by a centrifugal force along with the grinding medium and collides with the opposed surface.

12. A grinding apparatus configured to grind a substance to be ground, the grinding apparatus comprising:

a rotating body configured to include therein a channel extending up to an opening formed in an outer peripheral surface of the rotating body, the rotating body being configured to be capable of accommodating in the channel the substance and a grinding medium capable of grinding the substance;

a grinding container configured to include therein:

an accommodation space accommodating the rotating body; and an opposed surface opposed to the opening of the rotating body, the opposed surface extending annular about a center axis of the rotating body;

a removal unit that is located between the opposed surface and the rotating body so as to be opposed to the opposed surface in a radial direction of the rotating body; and a moving unit configured to move the removal unit in a circumferential direction of the opposed surface, wherein the grinding medium and the substance are capable of being moved from the channel to the accommodation space through the opening by rotating the rotating body, and the removal unit is moved by the moving unit to come into contact with the substance deposited on the opposed surface and remove the substance deposited on the opposed surface.

13. The grinding apparatus according to claim 12, wherein:

the moving unit moves the removal unit so that the removal unit revolves about a rotation axis of the rotating body; and a revolving speed of the removal unit revolved by the moving unit is lower than a rotation speed of the rotating body.

14. The grinding apparatus according to claim 12, further comprising:

a guide blade that has a surface facing in a direction of rotation of the rotating body and extending in the radial direction of the rotating body, the guide blade being disposed to be capable of revolving about a rotation axis of the rotating body, wherein revolution of the guide blade about the rotation axis generates an airflow in the accommodation space.

15. The grinding apparatus according to claim 12, wherein the opposed surface is formed of ceramics.

16. The grinding apparatus according to claim 12, further comprising a rotating-body rotating unit configured to rotate the rotating body about an axis parallel to the center axis of the rotating body.

17. The grinding apparatus according to claim 16, wherein, when the rotating body is rotated by the rotating-body rotating unit, the substance in the channel is moved toward the opposed surface through the opening by a centrifugal force along with the grinding medium and collides with the opposed surface.

* * * * *